Figure 1:

a
United States Patent [19]

Kubo et al.

[11] 4,162,924

[45] Jul. 31, 1979

[54] SHAPED BODIES OF CALCIUM SILICATE AND PROCESS FOR PRODUCING SAME

[75] Inventors: Kazuhiko Kubo; Akira Takahashi; Kenichi Ohashi, all of Gifu, Japan

[73] Assignee: Kabushiki Kaisha Osaka Packing Seizosho, Osaka, Japan

[21] Appl. No.: 769,402

[22] Filed: Feb. 11, 1977

[30] Foreign Application Priority Data

Feb. 13, 1976 [JP] Japan .................................. 51-15267
Nov. 4, 1976 [JP] Japan ................................. 51-132850

[51] Int. Cl.$^2$ .......................... C04B 1/00; C04B 7/34
[52] U.S. Cl. ...................................... 106/120; 106/97; 106/99; 423/331
[58] Field of Search .......................... 106/120, 97, 99; 423/331

[56] References Cited

U.S. PATENT DOCUMENTS

| | | | |
|---|---|---|---|
| 3,317,643 | 5/1967 | Denny | 106/120 |
| 3,501,324 | 3/1970 | Kubo | 423/331 |
| 3,679,446 | 7/1972 | Kubo | 106/120 |
| 3,988,419 | 10/1976 | Mori | 106/120 |

*Primary Examiner*—Winston A. Douglas
*Assistant Examiner*—J. V. Howard
*Attorney, Agent, or Firm*—Armstrong, Nikaido, Marmelstein & Kubovcik

[57] ABSTRACT

A shaped body of calcium silicate characterized by being composed of globular secondary particles interconnected with one another and each made up of lath-like xonotlite or foshagite crystals having been three-dimensionally interlocked with one another and having an index of crystallite antigrowth of at least 15, the globular secondary particles having had an outside diameter of about 10 to about 80 $\mu$m and an apparent density of up to 0.13 g/cm$^3$ and having been in the form of a shell with a hollow interior space and a thickness of about 0.3 to about 10 $\mu$m before being shaped into the body.

26 Claims, 17 Drawing Figures

SHAPED BODIES OF CALCIUM SILICATE AND PROCESS FOR PRODUCING SAME

This invention relates to shaped bodies of calcium silicate and to a process for producing the same.

Calcium silicate has been widely used in industries as a refractory, heat-insulator, filler, adsorbent, reinforcement, pigment, building material, etc. Calcium silicate will find still wider application because shaped bodies of calcium silicate are characterized by high specific strength, high refractory and heat-insulating properties, lightweight and excellent dielectric properties. These characteristics appear attributable mainly to two points: the form of calcium silicate crystals itself, and the structure of shaped bodies.

Kubo, one of the present inventors, carried out research on calcium silicate in respect of these two points and found that when calcium silicate crystals collect into secondary particles of very unique structure, the particles afford a calcium silicate shaped body which is lightweight and has great strength. This finding already matured to U.S. Pat. No. 3,679,446.

The patent discloses substantially globular secondary particles composed of lath-like calcium silicate crystals which are three-dimensionally interlocked together. The particles are 10 to 150 μm in outside diameter and have numerous lath-like calcium silicate crystals projecting from their surface in the form of whiskers. The calcium silicate shaped bodies prepared from the secondary particles have a low bulk density and high strength.

We have conducted further research on the structure of secondary particles of calcium silicate, on the state of the calcium silicate crystals per se and on the relations of the structure and of the state with calcium silicate shaped bodies and found that when calcium silicate crystals having unique properties or a unique crystalline structure are made into secondary particles of peculiar structure, the particles give a calcium silicate shaped body which is more lightweight and has much higher strength. We have also found that the shaped body, when fired at 1000° C., gives a product having greatly improved residual strength as compared with the conventional calcium silicate shaped bodies of the like type.

An object of this invention is to provide shaped bodies of calcium silicate which have much lower bulk density and higher strength than the calcium silicate shaped bodies heretofore known, and which when fired at 1000° C., retain exceedingly higher residual strength than that of the calcium silicate shaped bodies heretofore available.

Another object of this invention is to provide shaped bodies of calcium silicate which, when having the same bulk density of the calcium silicate shaped bodies heretofore known, have higher strength than the known shaped bodies.

Another object of this invention is to provide a process for producing shaped bodies of calcium silicate which have much lower bulk density and higher strength than the calcium silicate shaped bodies heretofore known, and which, when fired at 1000° C., retain exceedingly higher residual strength than that of the calcium silicate shaped bodies heretofore available.

These and other objects of this invention will become apparent from the following description.

The calcium silicate shaped bodies of this invention are characterized by being composed of globular secondary particles interconnected with one another and each made up of lath-like xonotlite and/or foshagite crystals having been three-dimensionally interlocked with one another and having an index of crystallite antigrowth of at least 15, the globular secondary particles having had an outside diameter of about 10 to about 80 μm and an apparent density of up to 0.13 g/cm³ and having been in the form of a shell with a hollow interior space and a thickness of about 0.3 to about 10 μm before being shaped into the body.

The index of crystallite antigrowth referred to above is an index (S) expressed by $$S = \frac{D_a \times D_b \times D_c}{D_{a'} \times D_{b'} \times D_{c'}} \times 100$$

where $D_a$, $D_b$ and $D_c$ are the dimensions of the crystallite of the xonotlite or foshagite crystal in the direction perpendicular to the reflections of planes of (400), (040) and (001), and $D_{a'}$, $D_{b'}$ and $D_{c'}$ are the dimensions of the crystallite of the β-wollastonite crystal in the direction perpendicular to the reflections of planes of (400), (020) and (002), when the xonotlite crystal or foshagite crystal is fired at 1000° C. for 3 hours and thereby converted to the β-wollastonite crystal. The dimensions in the crystallite-size are determined by the following method. The xonotlite or foshagite crystal is subjected to x-ray diffraction on perpendicular directions of its three planes of (400), (040) and (001). The β-wollastonite is subjected to x-ray diffraction on perpendicular directions of its three planes of (400), (020) and (002). Each dimension in the crystallite-size is given by the following equation (Scherrer's equation):

$$D = \frac{K\lambda}{\beta_{\frac{1}{2}} \cdot \cos\theta}$$

where:
D is the dimension in crystallite-size.
$\theta$ is diffraction angle,
K is 0.9, shape factor,
$\lambda$ is 1.514Å, the wavelength of x-rays (target Cu), and
$\beta_{\frac{1}{2}}$ is the half maximum line breadth of reflection plane.

The index of crystallite antigrowth (hereinafter referred to briefly as a "reciprocal growth index" or as an "index") will be described below in greater detail, for example, with reference to xonotlite crystals. Xonotlite crystals, when fired at 1000° C. for 3 hours, transform to β-wollastonite crystals, with the tendency of the transformed β-wollastonite crystallites growing larger than the original crystallites of xonotlite. The dimensions in the xonotlite crystallite-size are determined, based on the half maximum line breadth of the reflection planes of (400), (040) and (001) as determined by x-ray diffraction. Similarly, the dimensions in the crystallite-size of the β-wollastonite crystal obtained by firing the xonotlite crystal at 1000° C. for 3 hours are determined, based on the half maximum line breadth of reflection planes of (400), (020) and (002). The index is expressed as the reciprocal of the degree of the growth, namely as the ratio of the product of the three dimensions in the xonotlite crystallite-size to the product of the three dimensions in the β-wollastonite crystallite-size. Thus, if xonotlite crystals have a great reciprocal growth index, the β-wollastonite crystals resulting from the firing of the xonotlite crystals at 1000° C. for 3 hours have a reduced tendency toward growth, with the result that the β-wollastonite crystals undergo reduced dimensional changes relative to the original xonotlite crystals. This invention has been accomplished based on the novel finding that when xonotlite or foshagite crystals have a reciprocal growth index of at least 15 and the unique secondary structure to be described below in detail, the crystals give calcium silicate shaped bodies which have a greatly reduced bulk density and improved strength and which, when fired at 1000° C., retain greatly improved residual strength.

Figure 2:
Figure 3:
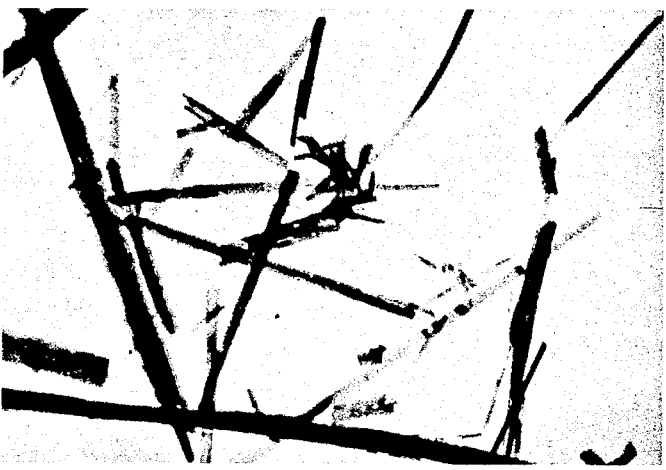
Figure 4:

FIG. 1 shows xonotlite crystals prepared in Example 1 and having a reciprocal growth index of at least 15 as observed under an electron microscope at a magnification of 30000X. When fired at 1000° C. for 3 hours, the xonotlite crystals are transformed into μ-wollastonite crystals whose electron micrograph at the same magnification is shown as FIG. 2. Comparison between FIG. 1 and FIG. 2 reveals hardly any change in appearance between the xonotlite crystals prior to the firing and the transformed β-wollastonite crystals. Thus, the xonotlite crystals, when examined under an electron microscope, are found to be fibrous or acicular crystals having an elengation in parallel to the b-axis and an extinction contour line and in the form of a single crystal thin film. Further FIGS. 1 and 2 show that the β-wollastonite obtained by heating the xonotlite at 1000° C. for 3 hours has exactly the same form as the xonotlite and possess and elongation in parallel to the b-axis, suggesting that the heating reaction is topotactic. The crystals in FIGS. 1 and 2 are examined for identification and elongation direction by selected area electron diffraction. On the other hand, FIG. 3 shows xonotlites prepared in Comparison Example 1 and having a reciprocal growth index of less than 15 as magnified to 30000X under an electron microscope. FIG. 4 shows the crystals obtained by firing the xonotlite crystals at 1000° C. for 3 hours. Comparison between FIG. 3 and FIG. 4 indicates marked changes in the appearance of crystals due to the growth of the crystals seen in FIG. 4. More specifically, the heating of the xonotlite at 1000° C. for 3 hours to β-wollastonite tends to eliminate the characteristic habit of xonotlite, increasing the thickness of the crystals, reducing the transparency of microscopic image thereof produced by electron rays and rendering the crystals round-edged in sintered state. Comparison between FIG. 2 and FIG. 4 appears to indicate that the heating reaction causing transformation to β-wollastonite in the latter case, although conducted at the same temperature and for the same period as the former case is not only a mere topotactic reaction but also involves destruction and recrystallization.

Figure 5:
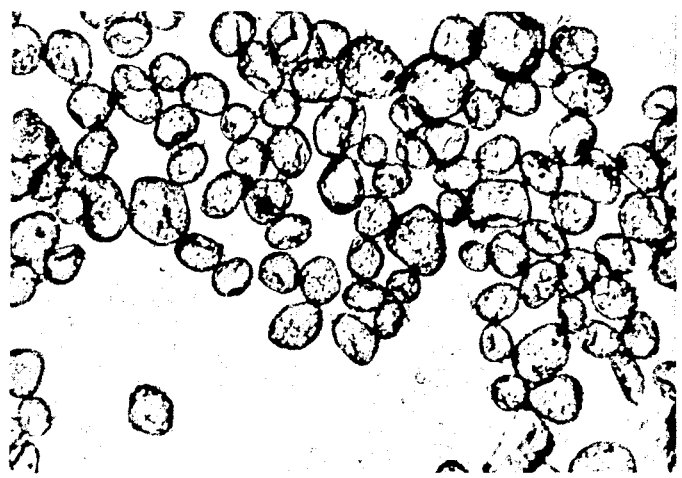
Figure 6:
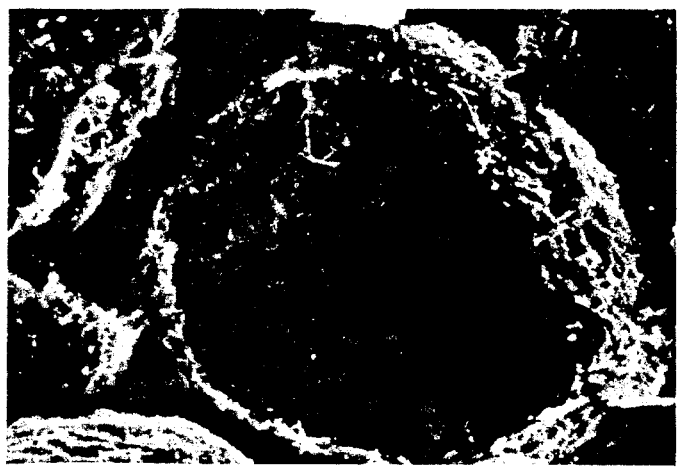
Figure 7:
Figure 8:
Figure 9:
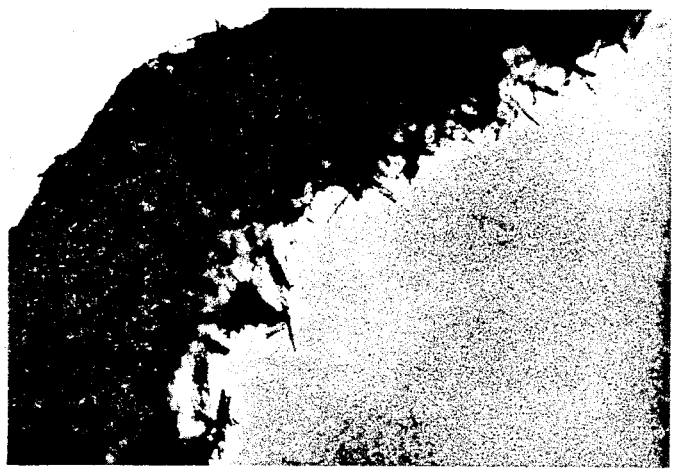

It is critical that the calcium silicate shaped bodies of this invention be composed of globular secondary particles interconnected with one another and each made up of lath-like xonotlite and/or foshagite crystals having been three-dimensionally interlocked with one another and having a reciprocal growth index of at least 15. Prior to the shaping, the globular secondary particles have an outside diameter of about 10 to about 80 μm and an apparent density of up to 0.13 g/cm³ and are in the form of a shell having a hollow interior space and a thickness of about 0.3 to about 10 μm, preferably about 0.05 to 4.0 μm. First, a description will be given of the structure of the globular secondary particles before shaping. For example, globular secondary particles prepared in Example 1 to be given later are shown in FIG. 5 as observed under an optical micrograph at a magnification of 200X prior to shaping. The photograph indicates that the secondary particles of this invention are globular and have an outside diameter of about 10 to about 80 μm, predominantly of about 20 to about 50 μm. FIG. 6, a scanning electron micrograph showing the same secondary particles at a magnification of 3000X, reveals that lath-like xonotlite crystals are interlocked with one another into a shell having a hollow interior space. FIG. 7, an electron micrograph showing the same secondary particles at a magnification of 15000X, reveals that the shell is composed of lath-like xonotlite crystals which are closely three-dimensionally interlocked together. Further FIG. 8 provides an optical micrograph showing at a magnification of 1100X a thin piece of specimen prepared by embedding the same secondary particles with synthetic resin and microtoming the resulting mass. The photograph indicates that the shells of the secondary particles have a thickness of about 0.5 of about 4.0 μm. The electron micrograph of FIG. 9 showing the same specimen at a magnification of 8700X also reveals that the shells of the particles are about 0.5 to about 4.0 μm in thickness and are made up of closely interlocked lath-like crystals of xonotlite. When an approximately 3 μm thick thin piece of specimen prepared by embedding globular secondary particles of this invention with resin and microtoming the resulting mass is observed under an optical microscope of the penetration type, it is found that the periphery of the particle is in the form of a clearly contoured globular shell having a completely hollow center portion and a thickness of about 0.5 to about 4.0 μm or an average thickness of about 1 to about 3 μm. The globular secondary particles of this invention have a thickness in the range which is not limited to the above-specified values as in Example 1 but includes 0.5 to 10 μm. For instance, Example 3 shows the globular secondary particles having a thickness of 0.5 to 8.0 μm.

The secondary particles of this invention have an apparent density of up to about 0.13 g/cm³, mainly in the range of 0.06 to 0.13 g/cm³ and are therefore very light-weight. The apparent density is measured by the following method. Acetone is substituted for the water contained in a slurry of calcium silicate crystals forming globular secondary particles, and the resulting mass is dried at 105° C. for 24 hours to obtain the globular secondary particles in the form of a powder without breaking up the particles. A W gram portion of the powder is weighed out and placed into a beaker. Water is then applied to the particles with use of a burette, and the amount (V ml) of water required for completely impregnating the particles is determined (i.e. when a sudden increase occurs in the viscosity of the powder). The apparent density of the globular secondary particles is given by the following equation:

$$\rho(g/cm^3) = \frac{W(g)}{V(ml) + \frac{W(g)}{\rho x}}$$

where $\rho_x$ is the true specific gravity of xonotlite crystals or foshagite crystals. The true specific gravity of xonotlite crystals is 2.79, and that of foshagite crystals is 2.63.

The globular secondary particles of this invention have a further property of possessing an ignition loss of up to about 10% as determined by thermobalance analysis.

Figure 10:
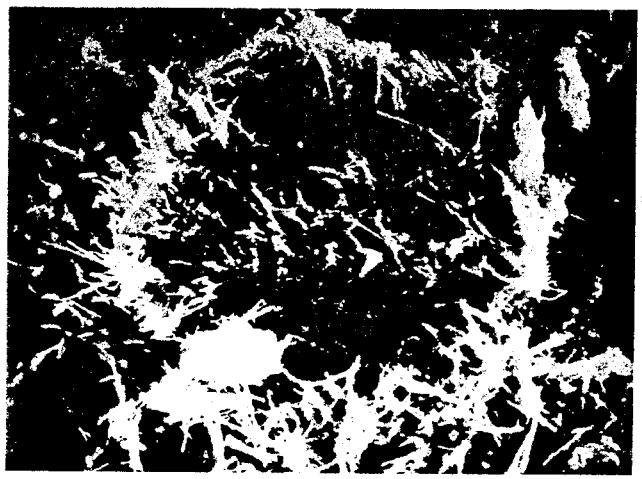
Figure 11:
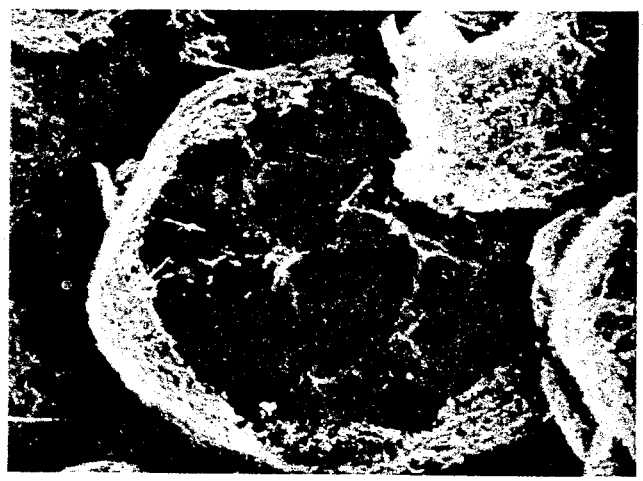
Figure 14:
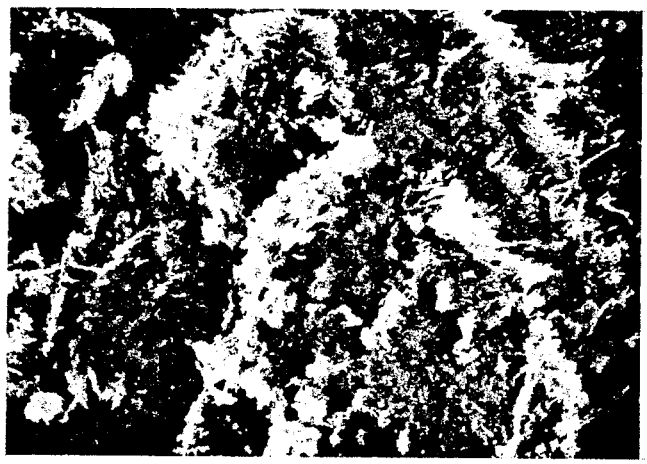
Figure 15:

The shaped bodies of this invention are composed of such globular secondary particles interconnected together as compressed by the shaping pressure. The globular secondary particles are increasingly deformed to a flat shape in the direction of the compression with increasing shaping pressure, namely with an increase in the bulk density of the shaped body. However, when the shaped bodies of this invention have a bulk density of up to 0.4 g/cm³, globular secondary particles can be identified by the observation of a fractured section of the shaped body under a scanning electron microscope. For example, FIG. 10 is a scanning electron micrograph showing at a magnification of 2000X a fractured section of a shaped body of this invention having a bulk density of 0.2 g/cm³. The photograph distinctly reveals the presence of globular secondary particles. Further FIG. 11 similarly shows a fractured section of the shaped body of Example 1 according to this invention, the body having a bulk density of about 0.1 g/cm³. The photograph also clearly reveals globular secondary particles. However, with an increase in the bulk density of the shaped body beyond 0.4 g/cm³, it is less likely for scanning electron micrographs to directly and clearly reveal the presence of globular secondary particles. FIG. 14 is a scanning electron micrograph showing a fractured section of a shaped body of this invention exceeding 0.4 g/cm³ in bulk density. It is seen that portions wherein acicular xonotlite crystals gather closely alternate with space portions in layers, presenting a striped structure. The layers of the striped structure extend approximately in the direction of elongation (b-axis) of xonotlite crystals, revealing a preferred orientation of the crystals. With shaped bodies having a bulk density of about 0.4 g/cm³, the hollow globular secondary particles, compressed and deformed by shaping operation, are in a discrete stripe-like arrangement, exhibiting a Gneissose structure. With an increase in bulk density beyond 0.4 g/cm³, there is a growing tendency that the hollow globular secondary particles are stacked in flat layers with reduced space portions, with the crystals more consistently oriented in a definite direction in preferred fashion, showing a Schistose structure involving distinct parallel planes as seen in FIG. 15. The globular secondary particles which are held together by the shaping operation, with adjacent shells thereof in close contact with one another, impart increased bending strength to the shaped body against a load acting at right angles to the layers of the striped structure.

The degree of preferred orientation, P, is in well corresponding relation to the appearance of the fractured section observed under a scanning microscope at a magnification of at least 600X. Stated more specifically, microscopic observation reveals substantially globular secondary particles at a P of about 5, a Gneissose structure at a P of about 10, a Gneissose to Schistose structure at higher P values, and a Schistose structure alone at a P of about 20, at which the fractured section distinctly exhibits Schistose planes perpendicular to the press direction. With shaped bodies exceeding 0.4 g/cm³ in bulk density, the prefferred orientation determined by the x-ray diffraction of a fractured section of the shaped body will show that the shaped body is composed of the globular secondary particles of the invention. In planes parallel to the compressed direction of the shaped body, xonotlite and/or foshagite crystals exhibit hardly any orientation irrespective of the bulk density of the shaped body, but in planes at right angles to the compressed direction the crystals are distinctly oriented. The degree of preferred orientation, P, is given by $$P \geq ax = b$$

where x, bulk density of the shaped body is in the range of $0.4 \leq x \leq 1.0$ and a and b are factors relating to the additional material contained in the shaped body as desired. (When no additives are used, a is 22 and b is 3.8.)

The degree of preferred orientation, P, of the crystals constituting the shaped body is determined by the following method. A portion of a shaped body is collected and finely divided. One gram portion of the fine particles, 0.2 g of lake-side cement and 5 cc of pentadioxane are thoroughly mixed together, the mixture is stirred with heating at about 80° C. to evaporate off the solvent, and the residue is comminuted in a mortar, whereby a powdery nonoriented specimen is prepared. From the shaped body whose degree of preferred orientation, P is to be determined, another specimen is prepared with a specified surface, e.g. a surface perpendicular to the compression direction, to be subjected to x-ray irradiation.

When the shaped body is composed of xonotlite crystals, the diffraction intensities of the two specimens are measured on the planes (320) and (001). The degree of preferred orientation, P, is given by $$P = \frac{I(320) \cdot I'(001)}{I(001) \cdot I'(320)}$$

where I(320) and I(001) are the diffraction intensities of the nonoriented specimen, and I'(320) and I'(001) are the diffraction intensities of the specimen whose degree of preferred orientation is to be determined.

In the case of a shaped body of foshagite crystals, the degree of preferred orientation, P, is given by the following equation. However, since the diffraction angle on (hkO) of foshagite is in overlapping relation to the angle of another plane and is not singly separable, the sum of the diffraction intensities on planes (220) and (121) are used, namely I [(220) + (121)] and I'[(220) + (121)].

$$P = \frac{I[(220)+(121)]}{I(001)} \cdot \frac{I'(001)}{I'[(220)+(121)]}$$

The orientation will be described in detail. As already stated, the orientation is the phenomenon that the xonotlite or foshagite crystals contained in the shaped body are oriented in a given direction by the shaping pressure. Such orientation takes place only in the shaped bodies composed of globular secondary particles interconnected together and made up of xonotlite or foshagite crystals having been three-dimensionally interlocked with one another, as in the shaped bodies of this invention and in those developed by one of the present inventors and disclosed in the aforesaid patent. Because the shaped body is composed of the globular secondary particles, the influence of the shaping pressure extorted on the particles varies from one portion of the particles to another portion thereof. The globular secondary particles of this invention and those of the patent are nearly the same in the density of the shells, and the shells of the two are subject to similar orientation. However, the globular secondary particles of the latter are higher than those of the former in apparent density, with the result that the shaped bodies of the invention are greater than the shaped bodies of the latter in the number of the secondary particles per unit area, if the shaped bodies have the same bulk density. Consequently, the secondary particles of the former are more subjected to compression and therefore undergo greater deformation, hence difference in the degree of preferred orientation between the two. In the case of calcium silicate shaped bodies composed of globular secondary particles interconnected together, the crystals are oriented with varying degrees due to the differences between the globular secondary particles constituting the shaped body. In preference to the crystals in the interior of the globular secondary particles, the crystals in the shell are subjected to the shaping pressure and oriented. Thus, the latter crystals have greater tendency toward orientation in preference.

Comparison between the shaped bodies of this invention and those of the aforesaid patent shows that the former have the feature of having an exceedingly higher degree of preference orientation than the latter.

With the shaped bodies of this invention, therefore, the determination of the preference orientation will evidence that they are composed of globular secondary particles having the specific structure of this invention. The degree of prefferred orientation of the shaped bodies of this invention is defined by the foregoing equation.

The shaped bodies of this invention are composed of very unique xonotlite or foshagite crystals having a reciprocal growth index of at least 15 and forming the globular secondary particles of the peculiar structure described above which are interconnected together. Accordingly the shaped bodies have a very low bulk density and high strength and, when fired at 1000° C., they retain exceedingly high residual strength.

The bulk density of the shaped bodies of this invention is limited by the apparent density of the globular secondary particles forming the shaped bodies. The smaller the apparent density of the secondary particles and further the greater the interior space of the secondary particles per se, the lower will be the bulk density of the resulting shaped body. For example, extremely lightweight shaped bodies are obtainable which have a bulk density of about 0.06 g/cm$^3$. Furthermore, an increased shaping pressure of course gives a shaped body of increased bulk density according to this invention.

The shaped bodies of this invention can be prepared from an aqueous slurry containing, as dispersed in water, globular secondary particles of lath-like xonotlite and/or foshagite crystals having a reciprocal growth index of at least 15 and three-dimensionally interlocked with one another, the secondary particles having an outside diameter of about 10 to about 80 $\mu$m and an apparent density of up to 0.13 g/cm$^3$ and being in the form of a shell having a hollow interior space and a thickness of about 0.3 to about 10 $\mu$m. The shaped bodies of this invention can be prepared from such aqueous slurry, with the desired characteristics ensured with ease. When the slurry is shaped, the water present among the secondary particles is readily removable from between the particles, permitting the shaping pressure to act uniformly throughout the slurry. The water within the particles counteracts the pressure, allowing them to retain their shape against rupture and to be pressed together. The interior water is slowly run off, following a reduction of water among the particles. The dewatered shaped mass thus obtained is then dried to a finished shaped body. In this way, the globular secondary particles in the slurry remain free of collapsing, forming a shaped body. The aqueous slurry has a water to solids weight ratio of at least 9:1, preferably approximately 15:1 to 30:1. The aqueous slurry may contain various additional materials when so desired to obtain calcium silicate shaped bodies of this invention incorporating such materials uniformly mixed therein. Examples of useful additional materials are reinforcing materials including inorganic fibers such as asbestos, rock wool, glass fibers, ceramics fibers, carbon fibers, metal fibers and the like, organic fibers such as pulp, rayon, polyacrylonitrile, polypropylene, wood fibers, polyamide, polyester and like fibers, etc. These additional materials advantageously impart higher shapability to the products on shaping as well as improved mechanical strength, hardness and other properties to the shaped bodies. Particularly the fibrous materials serve to enhance the mechanical strength of the shaped bodies. Various clays are also usable to afford improved heat-insulating properties. Furthermore, cements, plasters gypsum, colloidal silica, almina-sol and binders of the phosphoric acid or water glass type can be added to the slurry to reduce or eliminate the shrinkage of the shaped bodies during drying or to give increased surface strength to the shaped bodies. The shaped bodies can also incorporate a metal wire, metal reinforcement, etc. According to this invention, the aqueous alurry can be shaped by casting, spontaneous settling, centrifugal casting, sheet making, extrusion and like methods as well as by dewatering with use of press or rolls, etc.

Typically, useful aqueous slurries of globular secondary particles can be prepared by the following method.

Milk of lime having a sedimentation volume of at least 45 ml and predominantly crystalline silica are mixed together to obtain a starting slurry having a water to solids ratio of at least 15:1 by weight. The slurry is subjected to hydrothermal reaction by being agitated with heating at increased pressure to prepare a slurry of globular secondary particles of xonotlite or foshagite crystals according to this invention. The sedimentation volume refers to the volume of lime sedimented in a cylindrical container having a diameter of 1.3 cm and a capacity of at least 50 ml when 50 ml of milk of lime is placed into the container and allowed to stand for 20 minutes, the milk of lime being prepared by hydration from water and lime in a water to solids ratio of 24:1 by weight. The large sedimentation volume indicates that the lime in water is in a well-dispersed and stable state, and namely consists of extremely small particles, thereby exhibiting high reactivity. Thus this invention contemplates producing the secondary globular particles with a thin shell and a low apparent density by use of the lime of excellent reactivity. The above-described method of preparation essentially requires the use of milk of lime having extremely high dispersibility and stability, i.e. at least 45 ml in terms of sedimentation volume. If the milk of lime has a sedimentation volume of less than 45 ml, it is impossible to obtain the unique globular secondary particles of this invention. Such highly dispersible and stable milk of lime having a sedimentation volume of at least 45 ml is a very special lime milk which has never been used in the conventional processes for the manufacture of calcium silicate shaped bodies of the type described. However, the method itself of preparing such special lime milk is of secondary importance and is not particularly limited, because any milk of lime is useful insofar as it has a sedimentation volume of at least 45 ml. The sedimentation volume of the milk of lime is dependent on the limestone used as the starting material, the firing temperature for the production of the lime, the amount and temperature of water used for hydrating the lime, the agitating conditions for the hydration, etc. and is dependent particularly on the temperature and agitating conditions for the hydration. It is impossible to prepare any milk of lime having a sedimentation volume of at least 45 ml by the usual method of production of lime milk.

Milk of lime having a sedimentation volume of at least 45 ml can be prepared, for example, by vigorously agitating water and lime in a water to solids ratio of at least 5:1 by weight at a high speed, preferably at a temperature of at least 60° C. The desired lime milk is obtainable by intensive agitation, for example, with use of a homomixer. The speed and intensity of the agitation can be lowered, if the mixture is agitated for a prolonged period of time or at a higher temperature. For instance, a milk of lime hydrated at 20° C. can be made into the desired lime milk when agitated in a homomixer for a long period of time. Likewise, a milk of lime having a sedimentation volume of 46.5 ml can be produced from water and quick lime in a water to solids ratio of at least 5:1 by weight, by agitating the mixture so moderately as to prevent settling if the mixture is maintained at a temperature of 90° C. The agitators to be used are those of various types with or without baffle plates. Various limes are useful for the preparation of the milk of lime, such as quick lime.

Also usable are slaked lime, carbide slag, etc. Among these, quick is most suitable for giving an increased sedimentation volume.

Useful siliceous materials for the preparation of aqueous slurries of globular secondary particles of this invention are crystalline siliceous materials such as quartzite, quartz, sandstone quartzite, cemented quartzite, recrystallized quartzite, composite quartzite, silica sand, etc. These silicious materials used in the invention generally have an average particle size of up to 50 $\mu$m, preferablly up to 10 $\mu$m. Siliceous materials containing amorphous silica are also useful insofar as they consist predominantly of crystalline siliceous materials. It is also possible to use a mixture of crystalline siliceous material and less than 50% by weight of amorphous silica. The lime and siliceous material are used in a ratio desirable for the formation of xonotlite or foshagite crystals. The mole ratio of lime to siliceous material is preferably 0.85 to 1.1, more preferably 0.92 to 1.0, in the case of xonotlite crystals, and is preferably 0.9 to 1.5, more preferably 1.1 to 1.4 in the case of foshagite crystals. In this case another calcium silicate crystals may be produced in a little amount. The lime milk and siliceous material are mixed together in a water to solids ratio of at least 15:1 by weight to obtain a starting slurry. The starting slurry is heated with agitation at increased pressure for hydrothermal reaction. The reaction conditions such as pressure, temperature, agitating speed, etc. are suitably determined in accordance with the reactor, agitator and the type of the crystals of the reaction product. The hydrothermal reaction is conducted usually at a temperature of at least about 175° C. and at pressure of at least 8 kg/cm$^2$. The preferred reaction conditions are 191° C. and 12 kg/cm$^2$ for the production of xonotlite crystals or 200° C., 15 kg/cm$^2$ for the formation of foshagite crystals. The reaction time is reducible by elevating the temperature and pressure, and a shorter reaction time is economically advantageous. In view of safety operation, the preferred reaction time is within 10 hours. The speed of agitation for the hydrothermal reaction is suitably determined in accordance with the kinds of the materials and of the reactor and the reaction conditions. For example, the agitating speed is about 100 r.p.m. when a starting slurry having a water to solids ratio of 24:1 by weight and consisting of milk of lime with a sedimentation volume of 50 ml and finely divided siliceous material with an average particle size of 5 $\mu$m is subjected to hydrothermal reaction at 191° C. and 12 kg/cm$^2$ in a 3-liter reactor having a diameter of 150 mm and equipped with paddle-shaped agitating blades. Further when a starting slurry having a water to solids ratio of 24:1 by weight and consisting of milk of lime with a sedimentation volume of 47 ml and finely divided siliceous material with an average particle size of 5 $\mu$m is subjected to hydrothermal reaction under the same conditions as above, the agitating speed is about 300 to about 1500 r.p.m., or is about 70 to about 150 r.p.m. if the reactor is equipped with baffle plates. The agitation can be effected by rotating or vibrating the reactor itself or by forcing a gas or liquid into the reactor or by some other method of agitation. The hydrothermal reaction of this invention may be carried out batchwise or continuously. When the reaction is conducted in a continuous manner, the starting slurry is continuously forced into the reactor while the reacted slurry (i.e. slurry of calcium silicate crystals) is being withdrawn at atmospheric pressure. Care must be taken so that the secondary particles will not be broken while being withdrawn. Alternatively, the starting slurry may be reacted at a reduced ratio of water to solids, such that the resulting slurry may be run off with a specified quantity of water forced into the reactor after the reaction.

For the preparation of calcium silicate crystals, a reaction accelerator, catalyst, nonsettling agent and the like can be added to the starting slurry as desired. Examples of such additives are wollastonite, calcium silicate hydrate, alkali such as caustic soda or caustic potash and various salts of alkali metals.

For the production of the aqueous slurry of globular secondary particles of this invention, the starting slurry prepared from the specified lime milk and siliceous material, with addition of water when desired, can further incorporate asbestos, ceramics fibers, rock wool or like inorganic fibers, and the resulting mixture may then be subjected to hydrothermal reaction. This gives an aqueous slurry in which the globular secondary particles of this invention and the inorganic fibers are uniformly dispersed in water. There is the following difference between the aqueous slurry thus obtained and an aqueous slurry prepared by adding the inorganic fibers to the aqueous slurry of globular secondary particles resulting from the hydrothermal reaction of the starting slurry. In the former case, the siliceous material and the lime material in the starting slurry are crystallized on the inorganic fibers while at the same time forming the globular secondary particles, with the resulting tendency that the globular particles will be formed as attached to the inorganic fibers. In the case of the latter slurry, the inorganic fibers are added after the crystals and globular secondary particles have been formed, with the result that the inorganic fibers, as a rule, are not joined with the globular secondary particles. Because of such difference, the shaped body obtained from the former slurry tends to have slightly higher mechanical strength than one prepared from the latter slurry.

The aqueous slurry of globular secondary particles prepared by the above process, when dried, affords the globular secondary particles of this invention. Since the globular secondary particles have the specified structure already described, namely since they are in the form of a shell composed of closely interlocked xonotlite or foshagite crystals and having a hollow interior space, the shaped body prepared therefrom have high mechanical strength, notwithstanding that the particles have a very small apparent density of up to 0.13 g/cm$^3$.

The globular secondary particles obtained by drying the aqueous slurry of the globular secondary particles of this invention from the specified lime milk and the siliceous material have the characteristics of having an initial deformation-resistant breaking load of 10 to 100 mg. per particle. The term "initial deformation-resistant breaking load" herein used means a load under which, while globular secondary particles are being subjected to increasing load, the secondary particle still remains in shape against deformation but a crack develops at least partially in its shell. (The term will be hereinafter referred to briefly as "initial breaking load.") For example, the initial breaking load of 10 to 100 mg means that the shell of the secondary particle at least partially cracks under a load of 10 to 100 mg while otherwise remaining almost free of any deformation. The initial breaking load is measured, for example, by the following method. Three secondary particles of approximately the same size are placed on a slide glass in a regular triangular arrangement, a cover glass is placed over the particles and, while being subjected to increasing load, the particles are observed under an optical microscope at a magnification of 600X to check for cracking. The load is measured under which the particles remain free of deformation but a partial crack occurs in the shell of one of the particles.

The initial breaking load appears to be relevant to the structure of the secondary particle, and particularly to the density of the lath-like calcium silicate crystals in its shell, to the outside diameter and apparent density of the particle and to the state of the calcium silicate crystals. The secondary particles of this invention, in which the shell is made up of interlocked crystals with a high density and has a high ratio of interior space, are highly resistant to deformation, has an initial breaking load in the definite range of 10 to 100 mg per particle. When subjected to a load exceeding this range, the particles undergo marked cracking and are broken down. The globular secondary particles with an initial breaking load of 10 to 100 mg afford shaped bodies having a lower specific gravity and higher strength than the calcium silicate shaped bodies heretofore known. The shaped bodies of this invention further retain exceedingly high residual strength when fired at 1000° C.

For a better understanding of the features of this invention, examples are given below in which the parts are all by weight unless otherwise specified.

EXAMPLE 1

Figure 12:
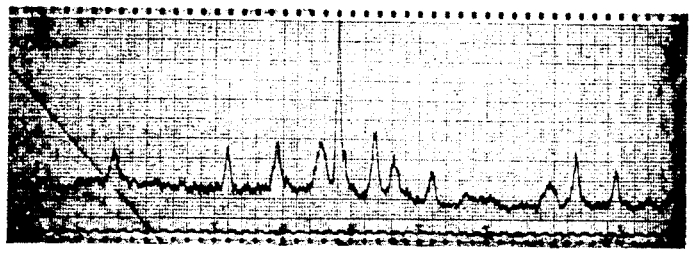
Figure 13:
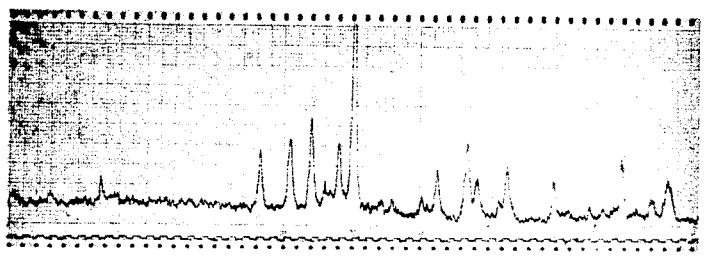

Quick lime (42.8 parts, SiO$_2$ 0.64%, Al$_2$O$_3$ 0.59%, Fe$_2$O$_3$ 0.08%, CaO 95.22%, MgO 1.32%, ig.loss 2.00%) is hydrated with 500 parts of water at 90° C., and the mixture is agitated in a homomixer for 30 minutes to disperse the lime in the water. The milk of lime thus obtained has a sedimentation volume of 50 ml. 45.2 parts of finely divided quartzite (SiO$_2$ 98.35%, Al$_2$O$_3$ 0.79%, Fe$_2$O$_3$ 0.17%, ig.loss 0.39%) about 5 μm in average particle size is added to the lime milk to prepare a starting slurry having a water to solids ratio of 24:1 by weight. The slurry is subjected to hydrothermal reaction at a temperature of 191° C. and at saturated steam pressure of 12 kg/cm$^2$ for 8 hours within a 3000 cc autoclave having an inside diameter of 15 cm, with its agitator blades driven at 540 r.p.m. The resulting slurry is found to be composed of xonotlite crystals as shown in FIG. 12, when dried at 110° C. for 24 hours and subjected to x-ray diffraction. The dimensions of the crystallite of the crystal as measured by x-ray diffraction on the planes of (400), (040) and (001) are: $D_a$ = 91Å, $D_b$ = 450Å and $D_c$ = 251Å. 2θ of the planes of (400), (040) and (001) are 20.9, 49.6 and 12.7. When the crystal slurry is dried on a slide glass and observed under an optical microscope at a magnification of 200X, globular secondary particles are identified which have an average outside diameter of 38 μm as seen in FIG. 5. When examined by the reflected light under optical microscope, the particles are found to have a distinct contour and an approximately transparent interior portion. When the crystal slurry is dried, the dried particles are embedded with n-butyl methacrylate resin, the resulting solid mass is microtomed to prepare an approximately 3 μm thick specimen, and the specimen is observed under an optical microscope at a magnification of 1100X and under an electron microscope at a magnification of 8700X, with the results shown in FIGS. 8 and 9 respectively. It has been found that the shells of the particles range from 0.5 to 4.0 μm and have an average thickness of 2.4 μm and that the shells have a completely hollow interior space. When the secondary particles are examined under an electron microscope at a magnification of 15000X, it is seen that the shells have numerous xonotlite crystals projecting from the surface in the form of whiskers as shown in FIG. 7. Observation of the same secondary particles under a scanning electron microscope at a magnification of 3000X reveals that they are in the form of a globular shell having a hollow interior space and made up of numerous xonotlite crystals three-dimensionally interlocked with one another as seen in FIG. 6. When the xonotlite crystals (primary particles) forming the secondary particles are observed under an electron microscope at a magnification of 30000X, they are found to be lath-like crystals about 1 to 20 μm in length and about 0.05 to about 1.0 μm in width and having extinction contour-lines. Differential thermal analysis of the crystals reveals hardly any peak, while thermobalance analysis thereof indicates a reduction at 750° to 820° C. When the crystals are fired at 1000° C. for 3 hours and thereafter analyzed by x-ray diffraction, β-wollastonite crystals are identified as shown in FIG. 13. The dimensions of the crystallite of the crystal measured on the planes of (400), (020) and (002) are: $D_{a'}$ = 235Å, $D_{b'}$ = 291Å and $D_{c'}$ = 340Å. 2θ of the planes of (400), (020) and (002) are 23.2, 50.0 and 25.4. These results give a reciprocal growth index of 44.2. When examined under an electron microscope, the β-wollastonite crystals are found to be in the same crystal form as xonotlite crystals and extinction contour-lines are also found.

Table 1 shows the properties of the secondary particles described above.

Table 1

| Properties | Measured value |
|---|---|
| Average size (μm) | 38 |
| Apparent density (g/cm$^3$) | 0.10 |
| Average weight of single particle (g) | 2.87 × 10$^{-9}$ |
| Thickness of shell (μm) | 0.5– 4.0 |
| Average thickness of | |

Table 1-continued

| Properties | Measured value |
| --- | --- |
| shell (μm) | 2.4 |
| Ratio of interior space (%) | 66.7 |
| Porosity (%) | 96.4 |
| Initial breaking load (mg) | 20 – 33 |
| Ignition loss (%) | 3.78 |

The porosity and ratio of interior space of the secondary particles given in Table 1 are determined in the following manner.

Porosity

The porosity is given by:

$$\text{Porosity} = \frac{\rho x - \rho}{x}$$

wherein $\rho$ is the apparent density of the secondary particles and $\rho x$ is the true specific gravity of xonotlite crystals, i.e. 2.79 (or 2.63 for foshagite crystals).

Ratio of Interior Space

The crystal slurry is dried, embedded with n-butyl methacrylate resin, the resulting solid mass is microtomed to obtain an approximately 3μ thick specimen, and the specimen in photographed under an optical microscope. The thicknesses of the shells are measured on the photograph to determine the average thickness, d, of the shells. The ratio of interior space is given by:

$$\text{Ratio of interior space (\%)} = \frac{(r - d)^3}{r^3} \times 100$$

where r is the average radius of the secondary particles.

The xonotlite crystal slurry obtained above is placed into a mold, allowed to stand for spontaneous settling and then dried to prepare a shaped body, the property of which is given in Table 2.

Table 2

| Property | Measured value |
| --- | --- |
| Bulk density (g/cm³) | 0.069 |

The optical micrograph and electron micrograph of a thin section of the shaped body appear the same as those of the slurry of secondary particles.

The slurry obtained above is press-shaped and dried at 120° C. for 20 hours to prepare shaped bodies. The properties of the shaped bodies are shown in Table 3 below.

Table 3

| Properties | I | II | III | IV | V | VI | VII |
| --- | --- | --- | --- | --- | --- | --- | --- |
| Bulk density (g/cm³) | 0.073 | 0.104 | 0.203 | 0.320 | 0.401 | 0.608 | 0.811 |
| Bending strength (kg/cm²) | 1.2 | 3.4 | 18.7 | 45.0 | 61.2 | 101.3 | 141.1 |
| Specific strength | 225.2 | 314.3 | 453.8 | 439.5 | 380.6 | 274.0 | 214.5 |
| Linear shrinkage on drying (%) | 0.72 | 0.25 | 0.11 | 0.02 | 0.00 | 0.00 | 0.00 |
| Preferred orientation (p) | 1.0 | 1.4 | 3.8 | 7.2 | 10.8 | 17.8 | 25.2 |

The properties of the above Table 3 are measured as follows;

Bending strength : *JIS A* 9510

$$\text{Specific strength} : \frac{\text{bending strength}}{(\text{bulk density})^2}$$

The shaped bodies II, III, V and VII shown in Table 3 are observed under a scanning electron microscope at a magnification of 2000 × to give respectively FIG. 11, FIG. 10, FIG. 14 and FIG. 15. The shaped bodies II and III (each of bulk density is 0.104 and 0.203) have a structure of globular secondary particles interlocked with one another, the shaped body V (bulk density is 0.401) has a geneissose structure, and the shaped body VII (bulk density is 0.811) has a schistose structure.

Glass fibers (5 parts), 5 parts of cement and 2 parts of pulp are added to 88 parts (solids) of the slurry obtained above. The mixture is press-shaped and dried at 120° C. for 20 hours to prepare a shaped body. The shaped body is impregnated with the same resin as used above, then cut to obtain a 3mm thick specimen, and the specimen are examined under an optical and an electron microscope. The constituent particles are found to be identical to those of the slurry in average particle size and shell thickness. X-ray diffraction analysis reveals that the shaped body is composed of xonotlite crystals. Table 4 shows the properties of the shaped body.

Table 4

| Properties | I | II | III | IV | V | VI |
| --- | --- | --- | --- | --- | --- | --- |
| Bulk density (g/cm³) | 0.075 | 0.100 | 0.225 | 0.412 | 0.673 | 0.840 |
| Bending strength (kg/cm²) | 2.1 | 7.1 | 38.2 | 92.5 | 145.3 | 198.7 |
| Specific strength | 373.3 | 710.0 | 754.6 | 544.9 | 320.8 | 281.6 |
| Linear shrinkage on drying (%) | 0.52 | 0.20 | 0.13 | 0.00 | 0.00 | 0.00 |
| Preferred orientation (p) | 1.0 | 1.1 | 2.3 | 6.7 | 10.3 | 13.2 |

The shaped bodies shown in Table 3 are fired at 1000° C. for 3 hours. Table 5 shows the properties of the resulting products.

Table 5

| Properties | I | II | III | IV | V | VI | VII |
| --- | --- | --- | --- | --- | --- | --- | --- |
| Bulk density (g/cm³) | 0.07 | 0.100 | 0.195 | 0.308 | 0.386 | 0.585 | 0.780 |
| Bending strength (kg/cm²) | 0.7 | 1.7 | 10.2 | 28.5 | 42.9 | 60.8 | 111.2 |
| Specific strength | 142.9 | 170.0 | 268.2 | 300.4 | 287.9 | 177.7 | 182.8 |
| Linear shrinkage after firing (%) | 1.02 | 0.95 | 0.81 | 0.80 | 0.75 | 0.72 | 0.68 |
| Residual specific strength (%) | 63.5 | 54.1 | 59.1 | 68.4 | 75.6 | 64.9 | 85.2 |

The shaped bodies shown in Table 4 are firet at 1000° C. for 3 hours. Table 6 shows the properties of the resulting products.

Table 6

| Properties | I | II | III | IV | V | VI |
| --- | --- | --- | --- | --- | --- | --- |
| Bulk density (g/cm³) | 0.072 | 0.096 | 0.216 | 0.395 | 0.645 | 0.805 |
| Bending strength (kg/cm²) | 1.1 | 4.8 | 32.1 | 65.3 | 101.0 | 148.5 |
| Specific strength | 212.1 | 520.8 | 688.0 | 418.5 | 242.8 | 229.2 |
| Linear shrinkage after firing (%) | 0.92 | 0.88 | 0.83 | 0.73 | 0.71 | 0.65 |
| Residual specific strength (%) | 56.8 | 73.4 | 91.2 | 76.8 | 75.7 | 81.4 |

EXAMPLE 2

A starting slurry prepared in the same manner as in Example 1 is placed into an autoclave having a capacity of 3000 cc and an inside diameter of 15 cm and is subjected to hydrothermal reaction at a temperature of 191° C. and at pressure of 12 kg/cm² for 4 hours, while being agitated at 540 r.p.m. The resulting crystal slurry is dried at 170° C. for 24 hours and then examined for its properties in the same manner as in Example 1. The dimensions of the xonotlite crystallite are determined on the planes of (400), (040) and (001) with the results of $D_a = 74$ Å, $D_b = 473$ Å and $D_c = 255$ Å respectively. $2\theta$ of the planes of (400), (040) and (001) are 20.9, 49.6 and 12.7. The crystals are fired at 1000° C. for 3 hours. The resulting $\beta$-wollastonite crystallite is analyzed to determine its dimensions on the planes of (400), (020) and (002), which are found to be $D_a' = 357$ Å, $D_b' = 324$ Å and $D_c' = 251$ Å respectively. $2\theta$ of the planes of (400), (020) and (002) are 23.2, 50.0 and 25.4. These results give a reciprocal growth index of 30.7. Table 7 shows the properties of the secondary particles.

Table 7

| Properties | Measured value |
|---|---|
| Average size (μm) | 31 |
| Apparent density (g/cm³) | 0.09 |
| Average weight of single particle (g) | 1.40 × 10⁻⁹ |
| Thickness of shell (μm) | 1.0 – 5.0 |
| Average thickness of shell (μm) | 3.2 |
| Ratio of interior space (%) | 50.0 |
| Porosity (%) | 96.8 |
| Initial breaking load (mg) | 30 – 40 |
| Ignition loss (T.G.A.) (%) | 4.52 |

In the same manner as in Example 1, the crystal slurry is spontaneously settled and spontaneously dried to obtain a shaped body, whose property is given in Table 8.

Table 8

| Property | Measured value |
|---|---|
| Bulk density (g/cm³) | 0.072 |

The slurry obtained above is press-shaped and dried at 120° C. for 20 hours to prepare shaped bodies. The properties of the shaped bodies are shown in Table 9 below.

Table 9

| Properties | I | II | III | IV | V | VI |
|---|---|---|---|---|---|---|
| Bulk density (g/cm³) | 0.091 | 0.121 | 0.205 | 0.413 | 0.620 | 0.821 |
| Bending strength (kg/cm²) | 1.1 | 4.2 | 16.9 | 58.2 | 71.2 | 105.4 |
| Specific strength | 132.8 | 286.9 | 402.1 | 341.2 | 185.2 | 156.4 |
| Linear shrinkage on drying (%) | 0.81 | 0.13 | 0.05 | 0.00 | 0.00 | 0.00 |
| Preferred orientation (p) | 1.0 | 1.5 | 3.3 | 8.5 | 14.5 | 20.3 |

A mixture of 90 parts (solids) of the slurry obtained by the above method, 2 parts of glass fibers, 3 parts of cement and 5 parts or rock wool is press-shaped to obtain a shaped body having a bulk density of 0.1. X-ray diffraction analysis reveals that the shaped body consists predominantly of xonotlite crystals. The constituent secondary particles thereof have the same properties as listed in Table 7. Table 10 shows the properties of the shaped body.

Table 10

| Properties | I | II | III | IV | V | VI |
|---|---|---|---|---|---|---|
| Bulk density (g/cm³) | 0.098 | 0.124 | 0.203 | 0.431 | 0.650 | 0.782 |
| Bending strength (kg/cm²) | 3.8 | 5.6 | 19.5 | 61.8 | 95.4 | 121.7 |
| Specific strength | 395.7 | 364.2 | 473.2 | 332.7 | 225.8 | 199.0 |
| Linear shrinkage on drying (%) | 0.45 | 0.31 | 0.10 | 0.07 | 0.00 | 0.00 |
| Preferred orientation (p) | 1.0 | 1.3 | 2.9 | 7.4 | 11.6 | 14.5 |

The shaped bodies shown in Table 9 are fired at 1000° C. for 3 hours. Table 11 shows the properties of the resulting products.

Table 11

| Properties | I | II | III | IV | V | VI |
|---|---|---|---|---|---|---|
| Bulk density (g/cm³) | 0.087 | 0.116 | 0.196 | 0.394 | 0.592 | 0.784 |
| Bending strength (kg/cm²) | 0.6 | 2.5 | 9.3 | 30.7 | 38.2 | 57.9 |
| Specific strength | 79.3 | 185.8 | 241.1 | 197.8 | 109.0 | 94.2 |
| Linear shrinkage after firing (%) | 1.04 | 0.99 | 0.85 | 0.77 | 0.68 | 0.35 |
| Residual specific strength (%) | 59.7 | 64.8 | 60.2 | 58.0 | 58.9 | 60.2 |

The shaped bodies shown in Table 10 are fired at 1000° C. for 3 hours. Table 12 shows the properties of the resulting products.

Table 12

| Properties | I | II | III | IV | V | VI |
|---|---|---|---|---|---|---|
| Bulk density (g/cm³) | 0.093 | 0.118 | 0.193 | 0.411 | 0.619 | 0.745 |
| Bending strength (kg/cm²) | 2.31 | 4.3 | 13.0 | 45.3 | 70.5 | 89.1 |
| Specific strength | 267.1 | 308.8 | 349.0 | 268.2 | 184.0 | 160.5 |
| Linear shrinkage after firing (%) | 1.07 | 0.90 | 0.88 | 0.73 | 0.70 | 0.65 |
| Residual specific strength (%) | 67.5 | 84.8 | 73.8 | 80.6 | 81.5 | 80.7 |

EXAMPLE 3

A starting slurry prepared in the same manner as in Example 1 is subjected to hydrothermal reaction in an autoclave, 3000 cc in capacity and 15 cm in inside diameter, at a temperature of 213.9° C. and at saturated steam pressure of 20 kg/cm² for 1 hour while being agitated at 300 r.p.m. The resulting crystal slurry is dried at 120° C. for 24 hours. When analyzed by x-ray diffraction, the slurry is found to be composed predominantly of xonotlite crystals. In the same manner as in Example 1, the dimensions of the crystallite of the crystal are determined, with the results that $D_a = 97$ Å, $D_b = 350$ Å and $D_c = 170$ Å. $2\theta$ of the planes of (400), (040) and (001) are 20.9, 49.6 and 12.7. The crystals are fired at 1000° C. for 3 hours. The crystallite of $\beta$-wollastonite formed has the dimensions of $D_a' = 365$ Å, $D_b' = 330$ Å and $D_c' = 250$ Å. $2\theta$ of the planes of (400), (020) and (002) are 23.2, 50.0 and 25.4. These results give a reciprocal growth index of 19.2. The secondary particles are examined for their properties in the same manner as in Example 1. Table 13 shows the results.

Table 13

| Properties | Measured value |
|---|---|
| Average size (μm) | 41 |
| Apparent density (g/cm³) | 0.127 |

Table 13-continued

| Properties | Measured value |
| --- | --- |
| Average weight of single particle (g) | $4.58 \times 10^{-9}$ |
| Thickness of shell ($\mu$m) | 0.5 – 8.0 |
| Average thickness of shell ($\mu$m) | 3.8 |
| Ratio of interior space (%) | 54.1 |
| Porosity (%) | 95.4 |
| Initial breaking load (mg) | 50 – 90 |
| Ignition loss (T.G.A.) (%) | 6.50 |

The crystal slurry is spontaneously settled and spontaneously dried to obtain a shaped body in the same manner as in Example 1. Table 14 shows the property of the body.

Table 14

| Property | Measured value |
| --- | --- |
| Bulk density (g/cm$^3$) | 0.068 |

The slurry obtained above is press-shaped and dried at 110° C. for 25 hours to produce shaped bodies, whose properties are shown in Table 15 below.

Table 15

| Properties | I | II | III | IV | V |
| --- | --- | --- | --- | --- | --- |
| Bulk density (g/cm$^3$) | 0.105 | 0.211 | 0.401 | 0.652 | 0.811 |
| Bending strength (kg/cm$^2$) | 3.7 | 10.8 | 40.2 | 58.1 | 98.5 |
| Specific strength | 335.6 | 242.6 | 250.0 | 136.7 | 149.8 |
| Linear shrinkage on drying (%) | 0.12 | 0.03 | 0.00 | 0.00 | 0.00 |
| Preferred orientation (p) | 1.0 | 2.7 | 6.5 | 11.8 | 16.7 |

To 90 parts (solids) of the slurry obtained by the above method and consisting predominantly of xonotlite crystals are added 5 parts of asbestos, 3 parts of cement and 2 parts of glass fibers, and the mixture is press-shaped to obtain a shaped body. The secondary particles forming the shaped body have the same properties as listed in Table 13. Table 16 shows the properties of the bodies.

Table 16

| Properties | I | II | III | IV | V |
| --- | --- | --- | --- | --- | --- |
| Bulk density (g/cm$^3$) | 0.11 | 0.212 | 0.380 | 0.654 | 0.821 |
| Bending strength (kg/cm$^2$) | 5.2 | 20.7 | 52.1 | 91.0 | 145.3 |
| Specific strength | 430.0 | 460.6 | 360.8 | 212.8 | 215.6 |
| Linear shrinkage on drying (%) | 0.05 | 0.01 | 0.00 | 0.00 | 0.00 |
| Preferred orientation (p) | 1.0 | 2.5 | 4.5 | 7.7 | 9.2 |

The shaped bodies shown in Table 15 are fired at 1000° C. for 3 hours. The resulting products have the following properties.

Table 17

| Properties | I | II | III | IV | V |
| --- | --- | --- | --- | --- | --- |
| Bulk density (g/cm$^3$) | 0.099 | 0.198 | 0.377 | 0.611 | 0.759 |
| Bending strength (kg/cm$^2$) | 2.2 | 7.0 | 25.9 | 30.8 | 51.3 |
| Specific strength | 224.5 | 178.6 | 182.2 | 82.5 | 89.0 |
| Linear shrinkage after firing (%) | 0.98 | 0.82 | 0.75 | 0.60 | 0.52 |
| Residual specific strength (%) | 66.9 | 73.6 | 72.9 | 60.4 | 59.4 |

The shaped bodies shown in Table 16 are fired at 1000° C. for 3 hours. The resulting products have the following properties.

Table 18

| Properties | I | II | III | IV | V |
| --- | --- | --- | --- | --- | --- |
| Bulk density (g/cm$^3$) | 0.104 | 0.200 | 0.357 | 0.613 | 0.768 |
| Bending strength (kg/cm$^2$) | 4.0 | 14.5 | 32.0 | 58.3 | 101.9 |
| Specific strength | 269.8 | 362.5 | 251.1 | 155.1 | 172.8 |
| Linear shrinkage after firing (%) | 1.01 | 0.74 | 0.42 | 0.38 | 0.31 |
| Residual specific strength (%) | 86.0 | 78.7 | 69.6 | 72.9 | 80.1 |

EXAMPLE 4

Figure 16:
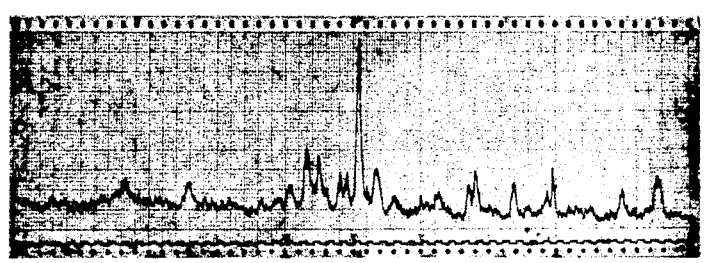
Figure 17:

Quick lime (55 parts, SiO$_2$ 0.34% Al$_2$O$_3$ 0.71%, Fe$_2$O$_3$ 0.09%, CaO 95.74%, MgO 0.97%, ig. loss 2.23%) is dispersed in 500 parts of water at 90° C. with use of a homomixer for 30 minutes to obtain a milk of lime having a sedimentation volume of 49 ml. Finely divided silica sand (45 parts, SiO$_2$ 99.59%, Al$_2$O$_3$ 0.16%, Fe$_2$O$_3$ 0.04%, CaO 0.02%, MgO 0.02%, ig. loss 0.13%) about 7 $\mu$m in average particle size is added to the lime milk to prepare a starting slurry having a water to solids ratio of 24:1 by weight. The slurry is subjected to hydrothermal reaction at a temperature of 211° C. and at pressure of about 19 kg/cm$^2$ for 6 hours while being agitated at 540 r.p.m. within a 3000 cc autoclave having an inside diameter of 15 cm. X-ray diffraction reveals that the resulting slurry consists predominantly of foshagite crystals and contains a very small amount of xonotlite crystals (FIG. 16). When examined under an optical microscope and an electron microscope in the same manner as in Example 1, the slurry is found to be composed of globular secondary particles of about 20 to about 40 $\mu$m, the particles being in the form of a shell having foshagite crystals projecting from its surface and closely resembling xonotlite crystals. The secondary particles have a reciprocal growth index of 39.5. 2$\theta$ of the planes of (400), (040) and (001) of foshagite are 36.9, 49.7 and 13.1, and that of (400), (020) and (002) of $\beta$-wollastonite are 23.2, 50.0 and 25.4. Table 19 shows other properties of the secondary particles.

Table 19

| Properties | Measured value |
| --- | --- |
| Average size ($\mu$m) | 34 |
| Apparent density (g/cm$^3$) | 0.11 |
| Weight of single particle (g) | $2.26 \times 10^{-9}$ |
| Thickness of shell ($\mu$m) | 0.5 – 4.0 |
| Average thickness of shell ($\mu$m) | 2.5 |
| Ratio of interior space (%) | 62.1 |
| Porosity (%) | 95.9 |
| Initial breaking load (mg) | 20 –45 |
| Ig. loss (%) | 5.32 |

The foshagite crystal slurry obtained above is placed into a mold, allowed to stand for spontaneous settling and then dried to prepare a shaped body, the density of which is 0.071 (g/cm$^3$).

To a portion (90.5 parts in solids) of the slurry are added 7 parts of asbestos, 1 part of glass fibers and 1.5 parts of portland cement, and the ingredients are mixed together and then pressed and dewatered for shaping. The shaped mass is dried to obtain a shaped body III. A shaped body IV is prepared in same manner as above except a pressure is changed when pressed. Shaped bodies I and II are also prepared only from the slurry. A shaped body V is further prepared in the same manner as the shaped body III except that the portland cement is replaced by 0.2 part of a colloidal silica in the form of solution (20% solids). Shaped bodies IV and IIV are also prepared from 90 parts (solids) of the slurry, 8 parts of glass fibers (shaped body IV) and 2 parts of pulp (shaped body IIV). Table 20 shows the properties of these shaped bodies.

Table 20

| Properties | I | II | III | IV | V | VI | VII |
|---|---|---|---|---|---|---|---|
| Bulk density (g/cm$^3$) | 0.095 | 0.420 | 0.101 | 0.105 | 0.103 | 0.442 | 0.697 |
| Bending strength (kg/cm$^2$) | 3.3 | 52.3 | 3.6 | 3.9 | 4.1 | 81.1 | 173.2 |
| Specific strength | 365.7 | 296.5 | 352.9 | 353.7 | 386.5 | 415.1 | 356.5 |
| Linear shrinkage on drying (%) | 0.15 | 0.05 | 0.12 | 0.18 | 0.09 | 0.01 | 0.00 |
| Preferred orientation (p) | 1.1 | 9.3 | 1.0 | 1.2 | 1.0 | 8.3 | 14.2 |

EXAMPLE 5

To 100 parts (solids) of the xonotlite crystal slurry obtained in Example 1 are added 1, 2, 5, 10 and 15 parts (solids) of polyacrylic ester dispersion (Mowinyl —742, trade mark, product of Hoechst Gosei, Co., Ltd., Japan) and each of the mixtures is placed into a mold with a wire net and then pressed and dewatered for shaping. Each of the shaped masses is dried at 170° C. for 10 hours to prepare a shaped body. Table 21 shows the properties of these shaped bodies.

Table 21

| Properties | I | II | III | IV | V |
|---|---|---|---|---|---|
| Acrylic acid ester-resin (parts) | 1 | 2 | 5 | 10 | 15 |
| Bulk density (g/cm$^3$) | 0.44 | 0.42 | 0.42 | 0.39 | 0.43 |
| Bending strength (kg/cm$^2$) | 63.1 | 74.0 | 89.1 | 93.9 | 95.8 |
| Specific strength | 325.9 | 419.5 | 505.1 | 617.4 | 518.1 |

EXAMPLE 6

To 100 parts (solids) of the xonotlite crystal slurry obtained in Example 1 are added 5 parts (solids) of the same emulsion as in Example 5 and the specified amount of pulp. Each of the resulting mixtures is placed into a mold with a wire net and then pressed and dewatered for shaping. Each of the shaped masses is dried at 170° C. for 10 hours to prepare shaped bodies I, II and III, whose properties are shown in Table 22 below.

Table 22

| Properties | I | II | III |
|---|---|---|---|
| Pulp (parts) | 5 | 15 | 25 |
| Bulk density (g/cm$^3$) | 0.60 | 0.60 | 0.61 |
| Bending strength (kg/cm$^2$) | 115.2 | 186.8 | 200.0 |
| Specific strength (kg/cm$^2$) | 320.0 | 518.9 | 537.5 |

EXAMPLE 7

To 100 parts (solids) of the xonotlite crystal slurry obtained in Example 1 are added 5 parts (solids) of the same emulsion as in Example 5, 10 parts of glass fiber and the specified amount of pulp. Each of the resulting mixtures is placed into a mold with a wire net and pressed and dewatered for shaping. Each of the shaped masses is dried at 170° C. for 10 hours to prepare a shaped body. The properties of these shaped bodies are shown in Table 23 below.

Table 23

| Properties | I | II | III | IV |
|---|---|---|---|---|
| Pulp (parts) | 5 | 10 | 15 | 30 |
| Bulk density (g/cm$^3$) | 0.61 | 0.64 | 0.65 | 0.70 |
| Bending strength (kg/cm$^2$) | 206.3 | 209.9 | 252.4 | 278.9 |
| Specific strength (kg/cm$^2$) | 554.4 | 512.5 | 597.4 | 569.2 |

EXAMPLE 8

Quick lime (42.3 parts) is hydrated with an amount of water 15 times the amount of the lime at 60° to 65° C. and dispersed with use of a homomixer for 30 minutes to obtain a milk of lime having a sedimentation volume of 46.0 ml. To the lime milk is added 45.2 parts of finely divided silica sand (SiO$_2$ 98.04%, Al$_2$O$_3$ 0.67%, Fe$_2$O$_3$ 0.04%, Cao 0.02%, MgO 0.02% ig. loss 0.13%) to prepare a starting slurry having a water to solids ratio of 18:1 by weight. The slurry is subjected to hydrothermal reaction at a temperature of 191° C. and at pressure of 12 kg/cm$^2$ for 8 hours in the same autoclave as used in Example 1 while being agitated at 140 r.p.m., the autoclave being equipped with a suitable baffle plate. X-ray diffraction reveals that the resulting slurry is composed of xonotlite crystals.

The crystals have a reciprocal growth index of 35.1 Table 24 below shows the properties of the globular secondary particles of the slurry.

Table 24

| Properties | Measured value |
|---|---|
| Average size (μm) | 35 |
| Apparent density (g/cm$^3$) | 0.11 |
| Average weight of single particle (g) | $2.47 \times 10^{-9}$ |
| Thickness of shell (μm) | 0.5–5 |
| Average thickness of shell (μm) | 2.6 |
| Ratio of interior space (%) | 61.7 |
| Porosity (%) | 96.1 |
| Initial breaking load (mg) | 20–60 |

The crystal slurry is pressed-shaped and dried at 120° C. for 20 hours to obtain shaped bodies A, B and C. Further a mixture of the slurry (90 parts in solids) and 10 parts of the same emulsion as in Example 5 is shaped and dried to obtain shaped bodies D, E and F. Table 25 below shows the properties of these shaped bodies.

Table 25

| Properties | A | B | C | D | E | F |
|---|---|---|---|---|---|---|
| Bulk density (g/cm$^3$) | 0.125 | 0.391 | 0.817 | 0.214 | 0.501 | 0.923 |
| Bending strength (kg/cm$^2$) | 5.2 | 40.2 | 121.1 | 35.7 | 114.7 | 219.1 |
| Specific strength (kg/cm$^2$) | 332.8 | 262.9 | 181.4 | 779.5 | 457.0 | 257.2 |
| Linear shrinkage on drying (%) | 0.34 | 0.00 | 0.00 | 0.00 | 0.00 | 0.00 |
| Preferred orientation (p) | 1.8 | 12.5 | 27.3 | 3.1 | 9.8 | 18.8 |

COMPARISON EXAMPLE 1

The same quick lime as in Example (41.5 parts) is hydrated with 500 parts of water at 75° C. to obtain a milk of lime having a sedimentation volume of 41 ml.

An aqueous dispersion containing 46.0 parts of finely divided silica dust (amorphous silica 93.20%, $Al_2O_3$ 0.18%, $Fe_2O_3$ 0.78%, CaO 0.12%, MgO 3.29%, ig. loss 1.68%) and prepared by being agitated in a homomixer for 20 minutes is added to the lime milk to obtain a starting slurry having a water to solids ratio of 24:1 by weight. The slurry is subjected to hydrothermal reaction at a temperature of 191° C. and at pressure of 12 kg/cm² for 8 hours in an autoclave while being agitated at 100 r.p.m., giving a slurry of xonotlite crystals.

The dimensions of the crystallite of the crystal measured an the planes of (400), (020) and (001) are: $D_a = 321Å$, $D_b = 380Å$ and $D_c = 197Å$. The diemnsions of the crystallite of the β-wollastonite crystal produced by firing at 1000° C. for 3 hours measured on the planes of (400), (020) and (002) are: $D_{a'} = 191Å$, $D_{b'} = 743Å$ and $D_{c'} = 722Å$. These results give a reciprocal growth index of 2.3.

Table 26 shown the properties of the secondary particles particles described above.

Table 26

| Properties | Measured value |
|---|---|
| Average size (μm) | 20 |
| Apparent density (g/cm³) | 0.125 |
| Average weight of single particle (g) | 5.23 × 10⁻¹⁰ |
| Thickness of shell (μm) | 1.0 – 8.0 |
| Average thickness of shell (μm) | 3.6 |
| Ratio of interior space (%) | 26.5 |
| Porosity (%) | 95.5 |
| *Initial breaking load (mg) | — |
| Ignition loss (%) | 5.23 |

*Initial breaking load can not be measured.

The slurry obtained above is press-shaped and dried at 120° C. for 20 hours to prepare shaped bodies I, II and III. Shaped bodies IV, V and VI are prepared by press-shaping a mixture of 90 parts of the above slurry (solids) and 10 parts of cement and drying at 120° C. for 20 hours. Table 27 shows the properties of the shaped bodies thus obtained.

Table 27

| Properties | I | II | III | IV | V | VI |
|---|---|---|---|---|---|---|
| Bulk density (g/cm³) | 0.108 | 0.205 | 0.413 | 0.229 | 0.431 | 0.814 |
| Bending strength (kg/cm²) | 4.0 | 10.4 | 48.2 | 38.4 | 92.1 | 140.2 |
| Specific strength | 342.9 | 247.5 | 282.6 | 732.3 | 495.8 | 211.6 |
| Linear shrinkage on drying (%) | 0.40 | 0.13 | 0.00 | 0.05 | 0.00 | 0.00 |
| Preferred orientation (p) | 1.4 | 2.8 | 5.5 | 2.2 | 4.8 | 11.2 |

The shaped bodies shown in Table 27 are fired at 1000° C. for 3 hours. Table 28 shows the properties of the resulting properties.

Table 28

| Properties | I | II | III | IV | V | VI |
|---|---|---|---|---|---|---|
| Bulk density (g/cm³) | 0.103 | 0.200 | 0.401 | 0.217 | 0.411 | 0.791 |
| Bending strength (kg/cm²) | 1.2 | 3.5 | 10.3 | 11.2 | 25.4 | 42.1 |
| Specific strength | 113.1 | 87.5 | 64.1 | 237.8 | 150.4 | 67.3 |
| Linear shrinkage after firing (%) | 1.21 | 0.98 | 0.73 | 0.96 | 0.71 | 0.68 |
| Residual | 33.00 | 35.4 | 22.7 | 32.5 | 30.3 | 31.8 |

Table 28-continued

| Properties | I | II | III | IV | V | VI |
|---|---|---|---|---|---|---|
| specific strength (%) | | | | | | |

COMPARISON EXAMPLE 2

The same quick lime as in Example 1 (42.3 parts) is hydrated with 500 parts of water at 90° to 95° C. to obtain a milk of lime having a sedimentation volume of 41 ml. To the lime milk is added 45.2 parts of the same quartzite as in Example 1 to prepare a starting slurry having a water to solids ratio of 24:1 by weight. The slurry is subjected to hydrothermal reaction at a temperature of 191° C. and at pressure of 12 kg/cm² for 10 hours in an autoclave while being agitated at 100 r.p.m. X-ray diffraction reveals that the resulting slurry is composed of xonotlite crystals. The dimentions of the crystals in the xonotlite crystallite-size are $D_a = 360Å$, $D_b = 338Å$ and $D_c = 165Å$. When the crystals are fired at 1000° C. for 3 hours, the resulting crystals have dimensions in the crystallite-size of $D'_a = 602Å$, $D'_b = 304Å$ and $D'_c = 271Å$ respectively. These results give a reciprocal growth index S of 40.5. Table 29 below shows the properties of the globular secondary particles of xonotlite crystals.

Table 29

| Properties | Measured value |
|---|---|
| Average size (μm) | 62 |
| Apparent density (g/cm³) | 0.154 |
| Average weight of single particle (g) | 1.92 × 10⁻⁸ |
| Thickness of shell (μm) | 3.3 – 15 |
| Average thickness of shell (μm) | 7.3 |
| Ratio of interior space (%) | 44.7 |
| Porosity (%) | 94.5 |
| Initial breaking load (mg) | 250–500 |
| Ignition loss (%) | 4.4 |

The slurry obtained above is press-shaped to obtain shaped bod es I, II and III. Further a mixture of the slurry (90 parts in solids), 5 parts of asbestos, 2 parts of cement and 3 parts of clay is press-shaped to obtain shaped bodies IV and V. Table 30 below shows the properties of the shaped bodies.

Table 30

| Properties | I | II | III | IV | V | VI |
|---|---|---|---|---|---|---|
| Bulk density (g/cm³) | 0.102 | 0.201 | 0.421 | 0.815 | 0.254 | 0.753 |
| Bending strength (kg/cm²) | 0.5 | 6.9 | 20.5 | 41.7 | 10.2 | 40.8 |
| Specific strength | 48.1 | 170.8 | 115.7 | 62.8 | 158.1 | 72.0 |
| Linear shrinkage on drying (%) | 0.13 | 0.06 | 0.00 | 0.00 | 0.00 | 0.00 |
| Preferred orientation (p) | 1.1 | 2.0 | 3.8 | 7.5 | 2.1 | 5.6 |

The shaped bodies shown in Table 30 are fired at 1000° C. for 3 hours. Table 31 shows the properties of the resulting products.

Table 31

| Properties | I | II | III | IV | V | VI |
|---|---|---|---|---|---|---|
| Bulk density (g/cm³) | 0.102 | 0.200 | 0.421 | 0.815 | 0.253 | 0.751 |
| Bending strength (kg/cm²) | 0.3 | 5.5 | 15.3 | 29.1 | 7.4 | 30.2 |
| Specific strength | 28.8 | 137.5 | 86.3 | 43.8 | 115.6 | 53.5 |

Table 31-continued

| Properties | I | II | III | IV | V | VI |
|---|---|---|---|---|---|---|
| Linear shrinkage after firing (%) | 0.80 | 0.79 | 0.52 | 0.25 | 0.61 | 0.38 |
| Residual specific strength (%) | 59.9 | 80.5 | 74.6 | 69.7 | 73.1 | 74.3 |

What we claim is:

1. A shaped body of calcium silicate characterized by being composed of globular secondary particles interconnected with one another and each made up of lath-like xonotlite or foshagite crystals having been three-dimensionally interlocked with one another and having an index of crystallite antigrowth of at least 15, the globular secondary particles having had an outside diameter of about 10 to about 80 μm and an apparent density of up to 0.13 g/cm³ and having been in the form of a shell with a hollow interior space and a thickness of about 0.3 to about 10 μm before being shaped into the body.

2. A shaped body as defined in claim 1 wherein the thickness of the shell is about 0.5 to about 4.0 μm.

3. A shaped body as defined in claim 1 wherein the outside diameter is about 20 to about 50 μm.

4. A shaped body as defined in claim 1 which has a bulk density of up to 0.4 g/cm³.

5. A shaped body as defined in claim 1 wherein when analyzed by x-ray diffraction the crystals exhibit hardly any orientation in planes parallel to the direction of compression but have a degree of orientation in planes at right angles to the direction of compression, the degree of orientation being defined by the equation $$P \geq ax - b$$

where P is the degree of orientation, x is the bulk density of the shaped body and is in the range of $0.4 \leq X \leq 1.0$, and a and b are variable with the amount of additional material contained in the body and are 22 and 3.8 respectively when no additional material is used.

6. A shaped body as defined in claim 1 which has a Gneissose structure.

7. A shaped body as defined in claim 1 which has a Schistose structure.

8. A shaped body as defined in claim 1 which incorporates an additional material uniformly therein.

9. A shaped body as defined in claim 8 wherein the additional material is a fibrous material.

10. A shaped body as defined in claim 9 wherein the fibrous material is organic fibers.

11. A shaped body as defined in claim 9 wherein the fibrous material is inorganic fibers.

12. A shaped body as defined in claim 8 wherein the additional material is a clay.

13. A shaped body as defined in claim 8 wherein the additional material is a binder.

14. A shaped body as defined in claim 13 wherein the binder is a cement.

15. A shaped body as defined in claim 13 wherein the binder is an organic binder.

16. A shaped body prepared by firing the shaped body as defined in claim 1 at a temperature of more than 1000° C. to convert xonotlite crystals to β-wollostonite crystals.

17. A process for producing a shaped body of calcium silicate comprising the steps of mixing together a milk of lime having a sedimentation volume of at least 45 ml and a crystalline siliceous material in a water to solids ratio of at least 9:1 by weight to prepare a starting slurry, subjecting the starting slurry to hydrothermal reaction while agitating the slurry with heating at increased pressure to obtain a slurry of xonotlite or foshagite crystals, shaping the slurry and drying the shaped product.

18. A process as defined in claim 17 wherein the milk of lime has a sedimentation volume of 47 to 50 ml.

19. A process as defined in claim 17 wherein the water to solids ratio is 15:1 to 30:1 by weight.

20. A process as defined in claim 17 wherein the starting slurry contains fibrous materials.

21. An aqueous slurry of calcium silicate characterized in that the slurry contains globular secondary particles dispersed in water and comprising lath-like xonotlite or foshagite crystals, the crystals having an index of crystallite antigrowth of at least 15 and three-dimensionally interlocked with one another into the particles, the globular secondary particles having an outside diameter of about 10 to 80 μm and an apparent density of up to 0.13 g/cm³ and being in the form of a shell with a hollow interior space and a thickness of about 0.3 to about 10 μm.

22. An aqueous slurry as defined in claim 21 which has a water to solids ratio of at least 15:1 by weight.

23. An aqueous slurry as defined in claim 21, wherein the secondary particles have an initial deformation resistant breaking load of 10 to 100 mg per particle.

24. An aqueous slurry as defined in claim 21 which contains an additional material uniformly dispersed therein.

25. Globular secondary particles of calcium silicate comprising lath-like xonotlite or foshagite crystals having an index of crystallite antigrowth of at least 15 and three-dimensionally interlocked with one another to the form of a hollow shell having a thickness of about 0.3 to about 10 μm, the particles being about 10 to about 80 μm in outside diameter and up to 0.13 g/cm³ in apparent density.

26. Globular secondary particles as defined in claim 25 wherein the shell has a thickness of about 0.5 to about 4.0 μm.

* * * * *